US010569176B2

(12) United States Patent
D'angelo et al.

(10) Patent No.: US 10,569,176 B2
(45) Date of Patent: Feb. 25, 2020

(54) VIDEO GAME GAMEPLAY HAVING NUANCED CHARACTER MOVEMENTS AND DYNAMIC MOVEMENT INDICATORS

(71) Applicant: Yacht Club Games, LLC, Marina Del Rey, CA (US)

(72) Inventors: David D'angelo, Los Angeles, CA (US); Alec Faulkner, Los Angeles, CA (US); Morgan Guyer, Santa Monica, CA (US); Michael Herbster, Pacoima, CA (US); Nickolas Wozniak, Los Angeles, CA (US); Sean Velasco, Santa Monica, CA (US); Ian Flood, Playa Vista, CA (US)

(73) Assignee: Yacht Club Games, LLC, Marina Del Rey, CA (US)

( * ) Notice: Subject to any disclaimer, the term of this patent is extended or adjusted under 35 U.S.C. 154(b) by 0 days.

(21) Appl. No.: 16/016,516

(22) Filed: Jun. 22, 2018

(65) Prior Publication Data

US 2019/0388786 A1    Dec. 26, 2019

(51) Int. Cl.
| | | |
|---|---|---|
| *A63F 13/537* | (2014.01) | |
| *A63F 13/23* | (2014.01) | |
| *A63F 13/25* | (2014.01) | |
| *A63F 13/533* | (2014.01) | |
| *H04N 21/478* | (2011.01) | |
| *A63F 13/426* | (2014.01) | |

(52) U.S. Cl.
CPC ............ *A63F 13/537* (2014.09); *A63F 13/23* (2014.09); *A63F 13/25* (2014.09); *A63F 13/426* (2014.09); *A63F 13/533* (2014.09); *H04N 21/4781* (2013.01); *A63F 2300/303* (2013.01); *A63F 2300/308* (2013.01)

(58) Field of Classification Search
None
See application file for complete search history.

(56) References Cited

U.S. PATENT DOCUMENTS

| | | | |
|---|---|---|---|
| 8,882,582 B2* | 11/2014 | Avent | A63F 13/10 463/23 |
| 8,944,914 B2* | 2/2015 | Hsu | A63F 13/00 463/31 |
| 2017/0294081 A1* | 10/2017 | Washington | G07F 17/32 |
| 2018/0001216 A1* | 1/2018 | Bruzzo | A63F 13/20 |

* cited by examiner

*Primary Examiner* — Ronald Laneau
(74) *Attorney, Agent, or Firm* — DLA Piper LLP (US); Campbell A. Yore

(57) ABSTRACT

Embodiments are directed towards providing video game gameplay incorporating nuanced character movements and context indicators. In a preferred embodiment, the context indicators include movement indicators programmed into a game world to dynamically interact with characters in order to provide real time information about character movements. The character movements and corresponding movement indicators are important to the combat and landscape navigation aspects of the gameplay design. By providing elements that make gameplay more challenging and engaging, the systems and methods described herein make video games more entertaining for players and profitable for game developers and publishers.

19 Claims, 8 Drawing Sheets

VIDEO GAME GAMEPLAY HAVING NUANCED CHARACTER MOVEMENTS AND DYNAMIC MOVEMENT INDICATORS

FIELD OF INVENTION

The present disclosure generally relates to video games, and more particularly to video game gameplay aspects including characters, character movements, landscapes, virtual objects, and contextualizing aspects including indicators and other information signaling mechanisms.

BACKGROUND

Video games have exploded in popularity and social importance over the last fifty years. Bolstered by heavy adoption of computers and consumer electronics devices, video games are an essential component of contemporary entertainment activities. Rapidly expanding computer power in accordance with Moore's Law coupled with vicious competition within the consumer electronics industry causes cheaper more capable gaming systems and computers to be released every year. Accordingly, many game developers and publishers have focused on providing hyper realistic graphics and massive, complex gaming worlds to fully leverage the abundance of available gaming device power. Although the recent trend toward more realistic game look and feel has created more lifelike experiences for gamers, many important aspects that made early games so popular have been overlooked, for example, intricate character movements, challenging gameplay, and subtle yet nuanced game world and environments.

From this motivation to rediscover the addictive magic of 70s, 80s, and 90s style arcade and NINTENDO ENTERTAINMENT SYSTEM (NES) games, the retro gaming movement was born. Retro games seek to break the modern trend of hyper realistic look and feel and immerive game environments in favor of relatively simple aesthetics coupled with more intricate gameplay. Developers and publishers innovating within the retro gaming genre are revamping old game titles and producing many new characters, plots, storylines, and titles. With the abundance of classic games already in existence, however, many developers are struggling to produce character animations and gameplay concepts that are truly unique. Additionally, due to competition from more realistic looking games, developers of retro style games struggle to produce gameplay sequences and game worlds that are as gripping as more aesthetically pleasing alternatives. Another challenge with designing retro style games is creating gameplay that is layered and nuanced enough to be challenging without being so detailed and precise as to make the game frustrating to play or impossible to complete.

Despite these challenges, retro games are becoming more and more popular year after year. This popularity evinces a well-established need for new characters, gameplay elements, and game world designs. In particular, ways for integrating novel character movements into a cohesive gameplay design are needed to meet the growing demand for video game entertainment. Additionally, methods of creating and implementing novel gameplay elements within a game world are needed to improve the player experience and aesthetics of retro games.

BRIEF SUMMARY OF INVENTION

The present invention relates to systems, devices, and methods for implementing and presenting nuanced character movements and novel gameplay elements within 2D and 3D game worlds. More particularly, the invention includes systems and methods for providing a gameplay design incorporating a series of intricate, interdependent character movements, for example, attack animations, climb animations, jump animations, and connecting movements. Systems and methods described herein further combine these movements with gameplay elements, for example, UI indicators and other objects that provide visual cues for distinguishing particular gameplay contexts and character situations. In one game world embodiment, one or more gameplay elements may indicate objects characters can interact with, the direction certain movements will take characters, timing cues for character movements, targeting information for character movements, and game world locations within a range of a character.

DETAILED DESCRIPTION OF INVENTION

Figure 1:
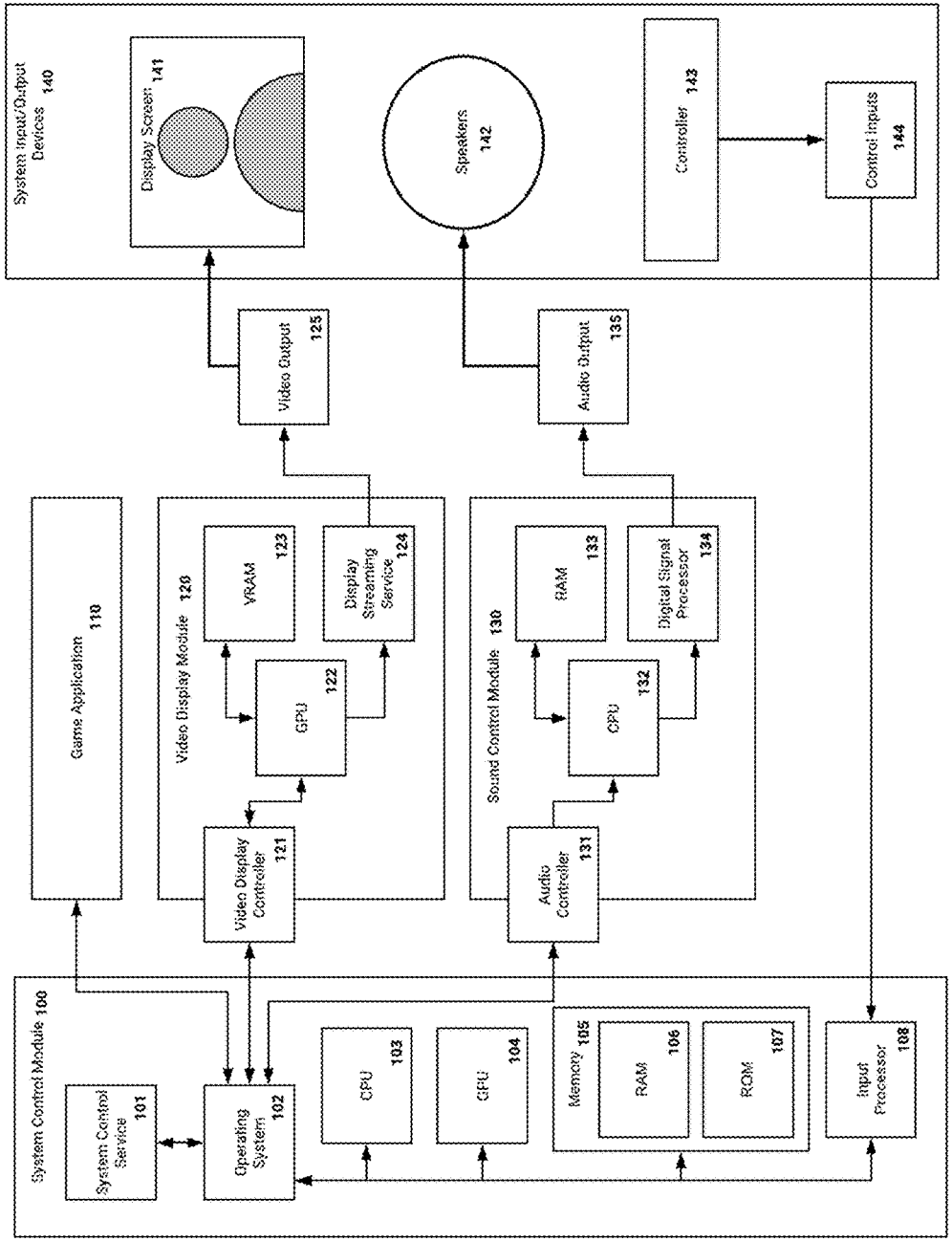
FIG. 1 illustrates one possible gaming device usable for implementing a preferred gameplay design in a video game.

Character movements provided by the systems, devices, and methods of the present invention include attack animations, climb animations, jump animations, and connecting animations. These animations control how characters move throughout the game world and how characters interact with other objects presented in the game. When playing the game, players precisely control each of these movements to accomplish objectives and otherwise progress through levels of the game and/or scenes of game world. Accordingly, the character movements are essential components of the overall gameplay experience meaning the entertainment derived from performing each movement is an essential component of the game's popularity.

The game world described herein augments important character movements with one or more additional gameplay elements, for example, visual cues and other indicators that provide more information about a particular character movement. In one possible game world, indicators may reveal the direction a character will move when performing a particular movement. Directional indicators allow players to anticipate paths characters will travel when performing a movement. Other indicators may signal a modified animation for a movement is available or reveal more information about particular gameplay contexts and character situations. Alternate movement indicators allow players to map out or plan ways of reaching or avoiding particular location within a scene of the game world. Accordingly, players can rely on these indicators to navigate to difficult to reach areas of scene or avoid pitfalls or other out of bounds regions. Another possible indicator signals a character animation that will occur after a particular character movement is performed. Forward looking indicators allow players to anticipate the most advantages next step in an attack sequence or navigate a particularly challenging stretch of terrain within a scene or level.

Exemplary character movements provided by the systems and methods described herein include dash slash, wall climb, wall jump, and connecting movements. In a preferred gameplay design, the dash slash is the primary attack movement and also has an important role in general character movement outside of combat situations. When used to move characters through scenes in the game world, the dash slash is a directional movement that depends on a launch object. Characters must be in close proximity to a launch object in order to use the movement function of the dash slash. In one example, in addition to being within range of a launch object characters must pass one or more validity tests in order to interact with a launch object. One or more validity tests for launch objects may also be used to further regulate interactions between characters and launch objects. Character validity tests may include, for example, whether a character is airborne or positioned on the ground and whether a character is performing another airborne action concurrently with interacting with a launch object. Object validity tests may include, for example, whether an object is dead and whether an object is a launch object type object.

The movement function of the dash slash launches characters into the air or, if already airborne, higher or lower in mid-air. Characters are launched in a particular direction by performing a dash slash in close proximity to a launch object. Depending on the gameplay context, it may be advantageous to use the dash slash to launch characters in a variety of directions. For example, characters launched upward using the dash slash gain more hang time, thereby allowing them to reach new positions or locations in a scene. Alternatively, characters launched at a downward angle may reach an area or enemy quicker than other descending techniques. Dash slashing in a movement context can also be used to improve a character's position relative to an enemy or other interactive object. For example, characters launched using the dash slash may be brought within range of an enemy in a dash slash state, thereby allowing characters to strike the enemy without performing additional positioning movements. In some cases, interacting with a launch object in a particular direction using the dash slash may be the only or most efficient way for characters to reach a position within range of an enemy in an attacking state. Additionally, using the dash slash to reach a specific position may be a preferred method of targeting a specific location on an enemy or object for an attack movement, for example, a dash slash attack.

The direction characters travel using the dash slash depends on a character's position relative to the launch object the character is interacting with via the dash slash. In one example, the direction of the dash slash movement is limited to four directions. An upward launch moves characters up and to the right or up and to the left and a downward launch moves characters down and to the right or down and to the left. In this example, the launch angle of the upward launch and downward launch is limited to forty five degrees. This dash slash movement is one possible launch movement provided for explanation purposes only and is not intended to limit the scope of the invention. Dash slash movements or other launch movements included in the gameplay design described herein may comprise movements in any direction, for example, left, right, up, down, diagonal, or any other orientation. The launch angle for the dash slash or other launching movement is not limited to forth five degrees. The gameplay design described herein incorporates dash slash and other launching movements having any launch angle including all launch angles between zero and three hundred and sixty degrees.

In one example, to perform a dash slash movement, characters must be airborne. Common ways to make characters airborne in the gameplay design include a jump from a horizontal standing position, a fall from a higher position, a fall from a lower position, a launch from a lower position, a launch from a higher position, or some combination. In addition to proximity constraints, one or more validity tests may be included within the gameplay design to limit the ability of characters to perform dash slash movements. The direction of the dash slash movement is determined by the position of a character in the air relative to the object the character is interacting with via the dash slash. In one example, characters moving to the right and positioned below the object will be launched upward at an angle to the right of their current position when performing a dash slash proximate to the object. Conversely, characters moving to the left and positioned above the object will be launched downward at an angle to the left of their current position. In addition to controlling the upward or downward launch angle of the dash slash movement, the character's position relative to the launch object determines if the character will be launched to the right of left when performing a dash slash. Characters facing to a left direction will be launched to the left and characters facing a right direction will be launched to the right.

This gameplay design allows players to precisely control character interactions with launch objects so that each launch object can provide four different dash slash movements based on the direction the player selects for the dash slash movement and the position of the character relative to the launch object. In this example, the four distinct dash slash movements are upward right for characters rising toward a launch object having a right directed dash slash movement; upward left for characters rising toward a launch object having a left direct dash slash movement; downward right for characters falling toward a launch object having a right directed dash slash movement; and downward left for characters falling toward a launch object having a left directed dash slash movement.

Due to the multi-directional nature of the dash slash movement, directional indicators are placed over launch objects. The directional indicators are programmed to display the direction and/or launch angle a character will move when interacting with a launch object. The directional indicators further indicate when characters are within the launch object's range of interaction. In this example, the directional indicator will not be displayed until a character is close enough to the location of a launch object for the character to interact with the launch object. Other program instructions, for example, object and/or character validity tests may further condition the display of one or more directional indicators as well as the interactions between characters and launch objects. Validity tests my include character validity tests, for example, whether a character is airborne or positioned on the ground and whether a character is performing another airborne action concurrently with interacting with a launch object. Object validity tests may include, for example, whether an object is dead and whether an object is a launch object type object.

The direction and launch angle may be determined using a dynamic method dependent on the airborne location of characters as well as the player selected dash slash movement direction. Accordingly, the launch angle signaled by the directional indicator will change from downward to upward as a character in close proximity to a launch object falls from above the object to below the object. Similarly, the direction of the launch angle shown by the directional indicator will shift from the right to the left when a player changes the direction of a character from the right to the left. In one example, the directional indicator is implemented as a reddish orange slash or gash shown over launch objects within the game world. Launch objects may be implemented as moveable or static objects, for example, a cauldron, lantern, swinging lantern, floating bubble, static creature, or flying creature. In this example, the directional indicator is programmed into the game world so that the indicator is contextualized within the game universe. By incorporating the directional indicator into the game universe instead of programming it as an abstract element outside the game universe, the directional indicator can dynamically interact characters as they move around the game universe thereby creating a more dynamic and engaging gameplay experience.

In addition to moving characters within the game world, the dash slash is the primary attack movement in the game. Accordingly, the dash slash is an essential component of combat gameplay and a key part of what makes playing the game entertaining. In the attack context, the dash slash may be a downward attack movement that allows characters to strike an enemy or boss from a position above the enemy at a downward angle. Similar to how characters interact with launch objects to travel within in the game universe, dash slash interactions in a combat context are dependent on the character's position relative to the enemy. The direction of the dash slash attack depends on the character's position relative to the enemy or boss. For example, when the character is on the ground performing a dash slash causes the character to perform a static attack movement, for example, a scythe slash or other weapon swing in a horizontal direction. The direction of the horizontal attack movement may be controllable by a player by pressing an area on a control pad portion of a controller. In other examples, the horizontal attack movement is automatically configured to go in the direction toward a boss or enemy. Similarly, for airborne characters rising or falling toward an enemy, the attack movement produced by the dash slash can be automatically aimed at the enemy. For characters rising toward an enemy, performing a dash slash will result in an upward direction attack animation. Conversely, for characters falling toward an enemy, performing a dash slash will result in a downward direction attack animation. The dash slash is one possible attack movement provided for explanation purposes only and is not intended to limit the scope of the invention. Other attacks containing movements in any direction, for example, left, right, up, down, diagonal, or any other orientation are included in the gameplay design described herein.

A targeting indicator may signal the direction of a character attack animation, for example, a dash slash, as part of the gameplay experience. In one example, the targeting indicator is programmed to appear over an enemy or boss. The targeting indicator may appear as a slash or gash having the same direction as a character attack movement. The direction and/or location of the targeting indicator may change dynamically in response to changes in a character's location relative to a boss or enemy. For example, characters falling toward an enemy will produce a downward angle targeting indicator over the portion of an enemy most proximate to the character. Similarly, characters rising toward an enemy will produce an upward angle targeting indicator over the portion of the enemy most proximate to the character. By signaling the attack direction and location, the targeting indicator enhances the gameplay experience by allowing players to more precisely control characters within the game world to achieve a desired outcome. For example, in combat situations with a shielded enemy, players may manipulate the position of attacking characters until the targeting indicator is positioned away from an enemy shield before attacking the enemy with a dash slash or other attack movement. This method maximizes damage done in combat by using the targeting indicator to select a vulnerable location on an enemy before attacking. The targeting indicator is one possible contextual indicator provided for explanation purposes only and is not intended to limit the scope of the invention. Targeting indicators displaying any attack angle or attack location are included in the gameplay design described herein. Other indicators may provide further information about attack sequences including available attacks, attack range, attack number, chains of attacks, attack combinations, attack damage, remaining life for character or enemy, attack targeting information, or any other information relevant to a gameplay context or particular character situation.

The combat gameplay further depends on the outcome of performing the dash slash or other attack movement. For example, in one implementation, dash slash attacks resulting in fatal blows to an enemy cause attacking characters to cut through the enemy. Alternatively, dash slash attacks delivering non-fatal blows to an enemy or movements striking shielded enemies cause characters to bounce backward away from the enemy. Characters can also use the dash slash movement to cut through other virtual objects for example, blocks, creatures, treasure chests, rockets, bombs, jewels, or food. These objects may be static or dynamic aspects of scene. Static objects remain in the same position within a scene landscape throughout a character's progression through a scene and dynamic objects move at least one of constantly, periodically, or at least once during a character's progression through a scene.

In one example, the bounce back animation following a non-fatal attack causes characters to spin, Contra spin, or otherwise flip in mid-air away from an enemy. As used herein, the term "Contra spin" refers to an acrobatic somersault spin animation popularized by the Contra video game series developed by KONAMI wherein the spinning character tucks his or her legs into their chest in order to streamline the spin. In one example, the bounce back animation causes characters to bounce back at an upward angle in the direction opposite the enemy regardless of a character's angle of attack. In other examples, players may control the direction of the bounce back animation to move the attacking character to a nearby surface, for example, a wall, ledge, platform, or ground surface. In another embodiment, the direction of the bounce back animation depends on the position of the attacking character relative to an enemy when performing an attack. For example, characters falling toward enemies will bounce back at an upward angle away from an enemy and characters rising toward enemies will bounce back at a downward angle away from an enemy.

Regardless of direction, to complete the bounce back animation, attacking characters must be able to land momentarily on a surface. In some gameplay situations, a misguided bounce back animation following a successful attack may cause a character to fall off of a scene landscape element and out of a game world. Additionally, misguided bounce back animations may result in damage or other harm inflicted on a character. In one example, the landing requirement of the bounce back animation adds complexity to combat sequences by forcing players to successfully control characters throughout the attack-bounce back sequence. This gameplay design levies penalties for misguided attacks and misguided bounce back animations. Successfully completed bounce back animations following a dash slash or other attack movement may be chained with other movements, for example, wall climbs, jumps, or wall jumps, to allow characters to reach previously inaccessible locations within the game world. The landing requirement of the bounce back animation makes the direction of the bounce back important to the gameplay experience. The bounce back direction of attacking characters is readily discernible from the targeting indicator appearing over the boss or enemy engaged with a dash slash or other attack movement. The targeting indicator also marks the attacking character's attack direction and location as well as, for fatal blows, the dash through direction. By providing three or more layers of meaning relevant to the dash slash attack and bounce back character movements, the targeting indicator enhances the combat gameplay experience by providing players information they may use to more precisely and efficiently target, strike, and defeat enemies.

This bounce back animation is one possible bounce back animation provided for explanation purposes only and is not intended to limit the scope of the invention. Bounce back animations having no landing require and bounce back animations in any direction, for example, left, right, up, down, diagonal, or any other orientation are included in the gameplay design described herein. Bounce back animations without a landing requirement may allow characters to perform another movement, for example, an attack, jump, run, climb, or other movement, as soon as they complete the flip or spin component of the bounce back animation.

Contextual indicators may be programmed into the game world to indicate if a character will cut through or bounce back when attacking an enemy. An indicator for signaling when a dash slash or other attack movement does damage to an enemy may also be incorporated. Other contextual indicators may convey other information, for example, how much life a character or enemy has left, the effectiveness of a particular attack, other attack options that are available to characters, movements enabled by control inputs in a particular gameplay context, or time left to destroy an enemy. Additional contextual indicators may provide other information about characters, enemies, objects, landscape elements, scenes, or other aspects of the game world. The contextual indicator embodiments described herein are provided for purposes of explanation only and are not indented to limit the scope of the invention. These indicators may be implemented within a game world to dynamically interact with characters as well as bosses, enemies, and other objects. In one example, a damage indicator causes the image of an enemy or boss to flash in response to a damaging dash slash or other attack movement. A cut through indicator may be implemented as a small shape or object, for example, a circle, augmenting the lower end of a dash slash attack targeting indicator. The appearance of the cut through indicator augmenting the targeting indicator signals to the player that the attacking character will cut through the enemy. Conversely, when the cut through indicator does not appear the player knows the attacking character will bounce back away from the enemy.

Wall climb is another character movement important to the gameplay design described herein. The wall climb movement is used for scaling walls, ledges, and other vertical surfaces included in one or more scenes within a game world. Additionally, when characters reach the top of a vertical surface using the wall climb movement, the wall climb animation may be combined with a flip, kip up, spin, or Contra spin animation to carry characters over the top of a vertical surface. Additionally, characters may reach the top of vertical surfaces in the game world by combining the wall climb animation with a wall jump animation. Including combinations of wall climbs, wall jumps, and kip ups or spins within the gameplay design gives players more control over character movements and allows characters to travel long vertical distances and reach distant or remote areas of scenes within a game world.

In one example, the wall climb movement is a fixed distance animation the moves characters a defined distanced up a vertical surface. Characters that fail to reach the top of a vertical surface after traveling the distance set by the wall climb animation, will fall or flip off of the vertical surface absent an additional movement. Accordingly, chaining the wall climb movement with jumps and changes of direction is necessary to make characters travel long vertical distances. To limit the vertical distance characters travel in one wall climb animation, a distance constraint may be implemented based on a timing restriction embedded in the wall climb animation. In this example, characters may only climb on a vertical surface for a defined amount of time. The speed of the animation and velocity of the character climbing movement correspond to the timing constraint to ensure characters move no more than the distance defined by the distance constraint in a single wall climb animation. The wall climb constraints included in the gameplay design make vertical travel an engaging and challenging aspect of navigating terrain within scenes of the game world.

To begin the wall climb animation, characters interact with a vertical surface using a movement animation, for example, running into, jumping on, launching on, or otherwise landing on a vertical surface. Holding the direction of a landing surface and bringing a character into contact with a wall or other vertical surface initiates the wall climb animation. Once initiated, the wall climb animation will move characters up a vertical surface toward the desired landing surface. Players may stop characters from climbing up a wall by pressing down, jumping off the wall, or performing an attack. Additionally, the vertical distance characters can travel using the wall climb movement is limited so reaching the maximum climbing distance before climbing to the top of the wall will also stop characters from climbing and cause them to flip off of the wall. A character reaching the top of a wall during a climbing animation performs a kip up movement and Contra spin above the vertical surface it just ascended. Continuing to hold the direction of the original landing surface causes the character to land on the surface. If the direction of the landing surface is not held through the kip up movement the character will not land on the surface. Instead, the character will begin to fall. The direction of the character's fall may be selected by holding a direction other than the direction of the landing surface. For example, if the original landing surface extended to the right of the top of the wall, holding left will cause characters to move left and avoid the landing surface to the right. If more than one landing surface exists at the top of a wall, players may select a landing surface by holding the direction of the landing they want to land on during the kip up movement. The kip up movement may also be combined with a dash slash, jump, or other character movement to interact with objects, for example, launch objects, creatures, or enemies.

In one example, the vertical distance traveled by the wall climb animation is limited by time and distance constraints that prevent characters from climbing long distances in one wall climb animation. To add additional vertical movement to the fixed climbing distance, the wall climb animation may be combined with one or more chaining movements, for example, a jump, flip, kip up, spin, or Contra spin. The timing of the kip up, spin, or other chaining movements is controllable by players in order to move characters in precise ways. If the character does not perform a chaining movement within the timing constraint, the character will flip off the wall. Therefore, characters must perform a chaining movement at or before reaching the maximum wall climb distance in order to continue the climbing sequence. In one example simple climbing sequence, characters wall climb on a first wall, wall jump from the first wall to a second wall and perform a wall climb movement on the second wall.

When jumping from one wall or other vertical surface to another the direction of a landing surface at one end of the succeeding wall must be selected. Holding the direction of the landing surface will cause the character to grab the succeeding wall and start climbing in the direction of the landing surface. Depending on the direction selected, characters may climb toward a landing surface on top of a wall or descend toward a landing surface at the bottom of a wall. Climbing sequences may include more than one jump and more than two walls or other vertical surfaces, for example, a climbing sequence including three jumps—one from a first wall to a second wall, one from the second wall to a third wall, and one from the third wall to a forth wall. Climbing sequences may also include other movements besides jumps and climbs, for example, runs, flips, spins, and dash slashes. One possible climbing sequence requires characters to scale two walls facing opposite directions, run a short section of flat then scale two additional walls facing opposite directions before spinning onto a moving landing platform.

In one possible climbing sequence with one jump and two walls, a character performs a wall climb movement on a wall on the right side of a scene. At or before the character reaches the maximum height of the wall climb movement, the character jumps in a left direction toward a wall on the left side of a scene to travel toward a landing surface on top of the left side wall. In one gameplay design, holding a left direction on a directional pad included in a game controller will make the character land on the left side wall, grab on to it, and perform a wall climb movement toward the landing surface on top of the left side wall. If the character reaches the top of the wall within the wall climb distance constraint, the character kips up above the ascended vertical surface. In one example, the kip up movement takes the character from a position with the character's back and torso parallel to the landing surface into a spin or Contra spin above the ascended vertical surface. To land on a landing surface following a kip up movement, a player must continue holding the direction of the landing surface. If no direction is selected, the character will fall back down the vertical surface it just climbed. In this example, holding the left direction would cause the character to land on a landing surface extending to the left at the top of the left side wall. In other examples, players may need to hold left, right, or neither in order to make characters land on a surface or move in a direction away from a landing surface. In some gameplay contexts, characters may want to purposefully avoid landing on a landing surface in order to get in range of interacting with an object, for example, a launch object, or avoid an enemy on a landing surface. Holding a direction away from a landing surface will prevent the character from landing on a surface in that direction, for example, holding right will avoid landing on a landing surface to the left of the character's current position.

One or more moving elements in a scene landscape may further complicate climbing sequences. In one example gameplay design, the game world includes one or more moving elements, for example, walls, horizontal surfaces, or objects that constantly and/or periodically rearrange the areas within a scene, for example, by creating new walls, opening holes in existing walls, creating and removing horizontal surfaces, moving creatures, bombs, and other harmful objects, and otherwise shifting the scene landscape. To successfully move characters across changing landscapes within the game world, players must be vigilant of the shifting areas and time wall climbs, jumps, kip ups, surface landings, and other movements to avoid interacting with harmful objects or landing on areas that no longer exist or will disappear before the player can move the character to another area. In one example, a character climbing on the left side of a vertical surface moving to the left may move out of the way, for example, to dodge an object or avoid being crushed, by holding the opposite direction of a climbing or landing surface. In this example, holding right would cause the character to avoid moving left or landing on a surface extending to the left.

Regardless of the complexity of climbing sequences, timing and direction controls enable characters to move vertically in a precise manner. To perform the simple climbing sequence mentioned above involving a right side wall, a left side wall, and a jump from the left side wall to the right side wall, a player had to time the jump from the first wall to the second wall before the distance constraint of the wall climb movement caused the character to fall back down the first wall. Additionally, a player had to hold the direction of a landing surface on top of the second wall in order to make the character grab on to the wall and start a wall climb movement in the direction of the landing surface. After climbing to the top of the left side wall, the player had to select a landing direction following the kip up movement above the left side wall to make the character land on the landing surface at the top of the wall. The player also had to time the wall climb and kip up movements so that a landable surface existed when the character reached the top of the left side wall. After safely landing a character on top of the second wall, the player then continues to move the character through the scene using any of the character movements described herein. For example, the character can continue traveling through the scene landscape by running over a flat or sloped area, falling into a lower area, jumping to—or launching toward—a third vertical surface, or some combination. This climbing sequence is one possible climbing sequence provided for explanation purposes only and is not intended to limit the scope of the invention. Climbing sequences containing movements in any direction, for example, left, right, up, down, diagonal, or any other orientation are included in the gameplay design described herein.

In addition to placing characters in positions to use other movements, climbing movements may be combined with spins, kip ups, flips, jumps, dash slashes or other character movements to produce chains of movements that cause characters to travel in precise ways and perform other actions within specific gameplay contexts. In one example, characters reaching the top of a vertical surface within the distance constraint of the wall climb animation will automatically flip over and above the top of the vertical surface. Players hold a direction of a landing surface to land the flip included in the kip up movement. Players must also time the climbing, kip up, and landing movements as well as orient the character within an accessible area of a scene to successfully land on a surface after completing a climbing sequence. In one example, a player holds a right direction to make a character climb toward a landing surface extending to the right of the vertical surface the character is ascending. In this gameplay context, continuing to hold the right direction once the character completes the climb and kips up above the vertical surface, causes the character to land on the landing surface to the right of the top of the ascended vertical surface. If the gameplay context changes, for example, a harmful object is located on the landing surface, or the scene landscape shifts so the landing surface no longer exists, a player may need to hold the left direction, another direction away from the landing surface, or no direction in order to avoid landing on the landing surface extending to the right of the top of the wall.

Depending on the gameplay context, characters may chain the kip up movement with a jump, dash slash, or other character movement to avoid landing on a landing surface, continue a climbing sequence, or otherwise progress through a scene. For example, combining the kip up movement and a dash slash interaction with a launch object will provide the character additional hang time needed to reach another vertical surface. The direction of the dash slash or other character movement chained with kip up movement is controllable to provide more precise character controls. In one possible character movement sequence, a character may climb the left side of a wall, kip up over the wall, and land on a landing surface to the right of the wall. After landing the kip up, the character may then change direction, run back to the left, fall off the wall in range of a launch object, interact with the launch object using a dash slash to launch toward a higher landing surface to the left of the wall the character just ascended, land on a wall just below the higher landing surface, grab onto and climb the right side of the wall, kip up over the wall, and land on a the landing surface extending to the left of the wall.

To perform this character movement sequence, a player had to hold a right direction to make a character climb the left side of a wall and land on a surface extending to the right of the top of the wall. The player continued holding the right direction during the kip up movement to make the character land on the surface to the right of the wall. The player then released the right direction and pressed the left direction to cause the character to change directions and run to the left over the edge of wall the character just ascended. To launch toward the higher landing surface, the player had to time the dash slash to interact with the launch object when the character was below the launch object but still within range. The player held the left direction while performing the dash slash to launch the character to the left of the launch object toward the higher landing surface to the left of the first wall. The player then continued holding the left direction to make the character grab onto the second vertical surface and start climbing toward the higher landing surface. Continuing to hold the left direction through the kip up movement following the wall climb movement caused the character to land on the higher landing surface to the left of the second wall.

Additional, gameplay context specific factors, for example, harmful objects or changing landscape elements may further complicate the timing and directional aspects of controlling character movements. For example, in game world implementations having changing landscapes, the direction and the timing of the wall climb, wall jump, wall grasp, kip up, and landing movements must be carefully selected in order to avoid areas that are not traversable or contain harmful objects. In one example, chaining the kip up animation with an airborne character movement, for example, a jump, spin, or dash slash may help a character avoid a pitfall or harmful object by adding additional height or distance to the character's kip up movement. The direction of airborne character movements is also controllable so that characters may reach surfaces that are to the right, left, above, or below the character's current position. Similarly, the direction of other character movements, for example, runs and wall climbs is also controllable to allow characters to reach precise locations before and after performing airborne movements. The directional and timing aspects of character movements allows characters to access isolated and difficult to reach areas of scenes and provides for a challenging and engaging gameplay.

Chaining the kip up movement over the top of a vertical surface with a dash slash is important in multiple gameplay contexts. Advantages in character movement and character combat contexts can be achieved by chaining these character movements. For example, characters in proximity to a launch object when flipping up over a ledge may use the dash slash to interact with the launch object and thereby move an additional distance or receive added hang time to reach another surface. In the combat context, characters in proximity to an enemy or boss may use a dash slash or other attack movement to strike an enemy immediately after flipping over a vertical surface to avoid exposing the character to a strike from an enemy. The directional control of the dash slash may remain in effect for both of these contexts and a directional indicator may indicate the direction of the dash slash or other movement following a flip up movement. Contextual indicators may also be incorporated into the gameplay design described herein to provide more information about the wall climb movement and chaining movements. For example, the direction of the wall climb, chaining movement, flip up movement as well as surfaces that can be reached by characters performing a movement in a particular direction may be shown using Contextual indicators. In the gameplay design described herein the contextual indicators may be implemented as user interface (UI) indicators that provide information to players by appearing within the game world presented in a UI component of a gaming device.

FIG. 1 illustrates one possible gaming device for implementing embodiments of the gameplay design disclosed herein. Components included in the gaming device may communicate directly, for example, through a message BUS, wired network connection, or any other suitable direct connection, or remotely with a content provider or other third party system or application through one or more wired or wireless networks, for example, an ad hoc network, an intranet, and extranet, a virtual private network (VPN), a local area network (LAN), a wireless LAN (WLAN), a wide area network (WAN), a wireless WAN (WWAN), a metropolitan area network (MAN), a portion of the Internet, a cellular telephone network, another type of network, or a combination of two or more such networks. The gaming device may be a computing device, for example, a personal computer, desktop computer, laptop, mobile phone, smartphone, tablet, handheld computer, or gaming consoles, for example, XBOX ONE, PLAYSTATION 4, NINTENDO WII, NINTENDO SWITCH, any previous version of one of these systems, or any other suitable game console.

The gaming device includes a system control module 100 for controlling overall system functionality, communicating with other system components, and processing input from one or more players playing a video game. The gaming device further includes a game application 110 containing program instructions for rendering an interactive video game gameplay experience and system input/output devices 140 that deliver the interactive video game gameplay experience to one or more players. The system control module 100 sends program instructions to the video display module 120 to generate the visual aspects of an interactive video game experience. Similarly, the control module 100 communicates with the sound control module 130 to provide the audio aspects of an interactive video game experience.

The system control module 100 includes a system control service 101 for managing processes and communications of the system control module 100. The system control service communicates with other components of the system control module 100 through an operating system 102 that controls the operation of the gaming device. For example, the operating system 102 interfaces with a main central processing unit (CPU) 103, a graphics processing unit (GPU) 104, and mass memory 105 to read program instructions stored in mass memory 105 and execute said instructions by performing a series of operations on one or more processors. The operating system 102 further interfaces with the video display controller 121 to send communications to and from the system control service 101 and the video display module 120. Similarly, to transmit communication to and from the system control service 101 to the sound control module 130, the operating system 102 interfaces with the audio controller 131. Program instructions for rendering an interactive video game gameplay experience included in a game application 110 are transmitted to one or more of the system control module 100, the video display module 120, or the sound control module 130 via the operating system 102. The CPU 103 and GPU 104 execute program instructions provided by the game application to generate the interactive game environment. Data processed and generated by the CPU 103 and GPU 104 is stored in a data storage application contained in mass memory 105. The memory includes temporary and long-term storage facilities. The random access memory (RAM) 106 acts as the work area of the CPU 103 and GPU 104 and temporarily stores the game program and character data. The RAM 106 further stores the operating system and one or more applications such as a video game client, game application, or data storage application. The read only memory (ROM) stores programs, such as a basic input/output system (BIOS) for controlling low-level operation of the gaming device. The BIOS may include, for example, a initialization program for starting the device or application and a shut down program for quitting an application or shutting down the device.

The system control service 101 controls input/output data from the video display module 120 by communicating with the video display controller 121 through the operating system 102. The video display module provides graphics and other visual data needed to render graphical aspects of virtual game world included in the interactive video game gameplay experience. The video display controller 121 controls input/output graphics data from the GPU 122 according to program instructions contained in the game application and elsewhere in mass memory 105. The VRAM 123 acts as the work station of the GPU 122 and temporarily stores characters, environments, scenes, and other graphical aspects included in a virtual game world having an gameplay experience according to the game application 110. Output data processed by the GPU are sent to the display streaming service 124 for display in a display screen 141. Video output 125 produced by the video display module may be encoded, transcoded, buffered, or otherwise reformatted for streaming by the display streaming service 124.

The system control service 101 controls input/output data from the sound control module 130 by communicating with the audio controller 131 through the operating system 102. The sound control module 130 provides sound effects, music, and other audio aspects included in the interactive video game gameplay experience provided by the gaming device. The audio controller 131 controls input/output data from the CPU 132. Instructions for generating sound data stored on the game application 110 are provided to the CPU 132 by the audio controller 131. Raw audio data for processing and processed audio data produced by the CPU is temporally stored in the RAM 133. Processed audio data output from the CPU 132 is sent to the digital signal processor 134 for conversion from digital audio signal to analog audio sound. Audio output 135 from the sound control module 130 may be mixed, blended, chopped, or otherwise paired with visual data generated by the video display module 120 so that the audio output 135 provides the right sound effect, music, or other audio at the appropriate time during the gameplay experience. For example, the sound control module 130 ensures the opening theme plays while the game is initializing and character movement sound effects play concurrently with characters performing the movements. Audio output 135 provided by the sound control module 130 is delivered to players over one or more speakers 142 within the system input/output devices 140. The speakers 142 may be stand alone or built into a display screen as part of a television, computer, or game console output device.

To interact with the game world, for example, to control characters or select a scene to play, players interact with one or more controllers 143. The controller 143 may be a game console controller, computer keypad, touch screen implementation, or other suitable device for entering control inputs 144. In one example, the controller 143 includes two or more action buttons and a directional control pad for controlling the direction of one or more character movements performed by pressing an action button. The input processor 108 within the system control module 100 receives control inputs 144 sent from the controller 143. The system control service 101 communicates with the input processor 108 via the operating system 102 to modify the interactive video game gameplay experience provided by the game application 110 in accordance with control inputs 144 received from controllers 143.

Figure 2:
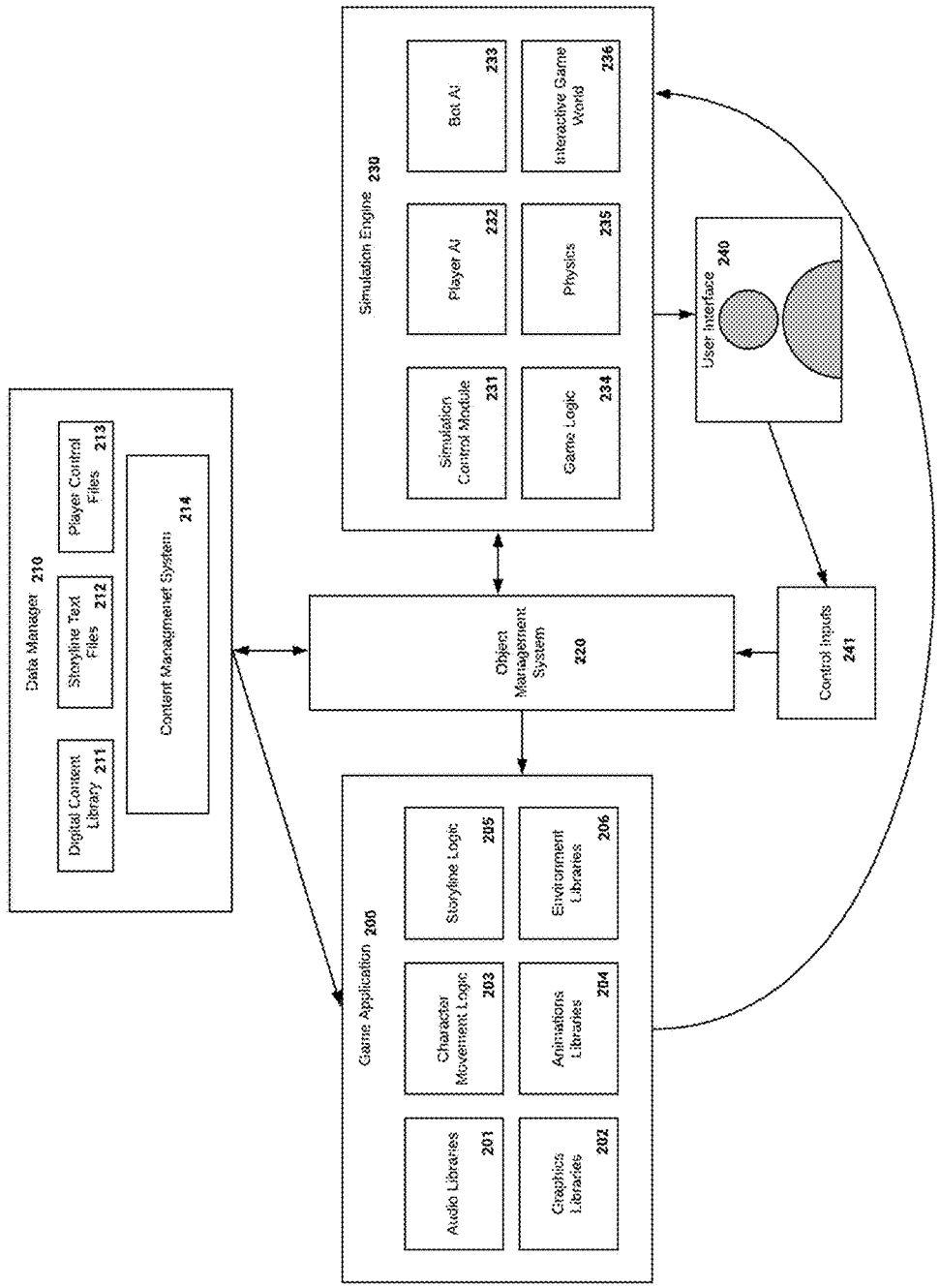
FIG. 2 illustrates one possible application architecture usable for implementing a preferred gameplay design in a video game environment.

FIG. 2 displays an application architecture for implementing the video game gameplay designs described herein. The data manager 210, game application 200, simulation engine 230, and user interface (UI) 240 components may communicate with each other directly through a message BUS or other messaging service or remotely through a wireless network connection. The architecture includes a game application 200 including program instructions, content assets, and other materials for providing aspects of a video game gameplay experience, a data manager 210 for controlling input/output data to the game application 200, a simulation engine 230 for rendering a video game simulation a UI 240, and an object management system 220 for updating state information to provide an interactive video game gameplay simulation that changes according to control inputs 241.

In one example, the game application 200 includes one or more libraries containing programming instructions for providing an interactive game world. The game application 200 further includes one or more logical components for assembling and ordering information contained in the libraries into a video game gameplay experience having a game world, objects, character movements, game, rules, game objectives, contextual indicators, and other gameplay aspects. Audio libraries 201 provide sound data, for example, audio files, digital signal processing instructions, mixing instructions, and other programming instructions suitable for producing music, recordings, sound effects, and other audio information in a game universe in a timely and efficient manner. Graphics libraries 202 provide graphics data, for example, images, textures, projections, screen scrolling instructions, display instructions, and other graphic information suitable for producing characters, landscapes, and other visual objects, in a game universe. Animations libraries 204 include animation assets, animation trees, projections, and other information suitable for producing character animations within a game universe. Animations for characters and well as other dynamic objects within a game universe including creatures, landscape objects, and UI indicators as well as other contextual indicators are provided in the animations libraries 204. The environment libraries 206 include background art, maps, scene landscape art, for example, tiles, objects, walls, rooms, and other scene components, scene rendering logic, scene projections, scene assembling instructions, and other information suitable for constructing one or more scenes within a game universe.

One or more logical components include instructions for selecting, filtering, sorting, combining, transforming, processing, and otherwise manipulating information provided by the one or more libraries for producing a game universe 201, 202, 204, and 206. In this example, the character movement logic 203 assembles character and movements from instructions, art assets, and projections provided by the graphics libraries 202 and animations libraries 204. Similarly, the character movement logic 203 may also generate movements for dynamic objects within the game universe, for example creatures, fire, moving platforms, swinging objects, flying objects, floating objects, jewels, and food. By interfacing with the audio libraries 201 and environment libraries 206, the character movement logic 203 may layer on sound effects to particular character movements and interactions with scene objects and components. For example, attack movements have a sound effect and characters may emit a sound effect when they touch fire or are otherwise damaged. Timing constraints and other validity tests may also be associated with certain character movements and/or movements of dynamic objects by the character movement logic 203. Additionally, any interactions with landscape components, for example, ropes, ladders, vertical surfaces, that produce specific character movements are provided by the character movement logic 203. The character movement logic 203 may also associate UI indicators with particular movements and provide instructions for determining the UI indicator, if any, to display for a specific type or direction of movement.

Storyline logic 205 integrates plot elements such as storyline text, scene sequencing, and scene transitions into a game universe. In one example, the storyline logic includes program instructions for presenting one or more storyline text files 212 received from the data manager 210 at the beginning, during, or ending of a scene. The storyline logic 205 may also interface with the character movement logic 203 to present storyline text when a character reaches a certain location within a scene, for example, a battle with a boss at the final stage of a scene. Some characters may also be associated with storyline text and other plot elements from the storyline logic 205. These elements may be presented according to instructions included in the storyline logic 205 immediately after a triggering event or action within the game universe, for example, when the character is first introduced, when the character reaches a certain position in a scene, performs a specific movement, or completes a task. By interfacing with one or more graphics libraries 202 or environment libraries 206, the storyline logic 205 may also sequence the order of scenes within a game universe and provide transitions from one scene to another. The storyline logic 205 may also interface with the audio libraries 201 to play a recording of the storyline text as the text is presented within a scene.

The data manager 210 interfaces with the game application 200 and object management system 220 to control the flow of data to each of the application components. Media content for example, streaming video containing game scenes, game replays or plot elements, audio recordings, screenshots, custom or purchased characters, and other graphic content that is custom, paid, updated, or incorporated from another game is stored in a digital content library 211 and provided to the game application 200 and object management system 220 for integration into a game simulation according to instructions contained in the content management system 214. Player control files 213 including saved game data, player control configurations, and other player specific data received via one or more control inputs 241 is also provided to the game application 200 and object management system 220 according to program instructions included in the content management system 214. Player control files provided by the data manger 210 may be used to restore saved games and previously saved controller configurations in the game simulation provided by the simulation engine 230.

In one possible application architecture, data included in the game application 200 will be the same for every player of the video game and an identical copy of the game application 200 will be loaded onto every instance of a particular device that renders the game. Additionally, data included in the game application 200 will not change when the game is played. Instead, the game application retains its original state until the game application code is patched, updated, or otherwise modified. This architecture allows a similar gameplay experience for all players and ensures consistent gameplay each time a player interacts with the game. To interact with the game application 200, the simulation engine 230 renders a simulation of the video game gameplay provided by the game application 200 in a player interface 240. Players control characters in the game simulation by entering one or more control inputs 241 through the player interface 240. The control inputs 241 are received by the object management system 220 that then generates updated object state information from the control inputs and updates the game simulation according to the updated object states. In this way, players are provided a unique, interactive simulation that they can control from application code that is the same in every device platform instance of the game.

The simulation engine 230 includes one or more logical components for rendering an interactive video game gameplay experience from program instructions provided by a game application 200 and object state information provided by an object management system 220. The simulation control module 231 controls the function of the simulation engine 230 generally and processes object state information updates received from the object management system 220. The simulation control module 231 interfaces with the interactive game world 236 to change the position of characters and objects in the game world in accordance with control inputs 241 received from a player interface 240. Player artificial intelligence (AI) 232 and bot AI 233 influence character and object movements within the interactive game world 236. Player AI 232 provides for automated movements of player controllable characters, for example, connecting movements between animations, and pre-programmed interactions with objects including ladders, moving platforms, slides, launch objects, and enemies. Player AI 232 may also include one or more validity tests, program instructions, or game logic for limiting the performance of specific character moments depending on the gameplay context. For example, characters can only before the dash slash launch movement when in range of a launch object. Bot AI 233 provides for automated movements of creatures, bosses, enemies, dynamic objects, static objects, and other interactive components of the game world. Movements provided by the bot AI 233 may be programmed to change according to game skill level, for example, easy, medium, hard, or impossible or player selected game universe configurations. Physics libraries 235 contain application code for simulating one or more physical systems, for example, rigid body dynamics, collision detection, soft body dynamics, and fluid dynamics. In this example, the physics libraries 235 control rendering of character movements, object movements, landscape aspects, character interactions with objects, character interactions with scene landscape aspects, and object interactions with scene landscape aspects within the interactive game world 236 to provide realistic simulations. Game logic 234 includes game rules that support the gameplay experience provided by the game application. The game logic 234 governs game play elements, for example, how characters move through scenes, interact with game objects, achieve scene objectives, fail scene objects, score points, damage objects, and progress through the game, to provide a consist gameplay experience for all players playing at the same selected skill level.

The simulation control module 231 interfaces with the object management system 220, game logic 234, player AI 232, bot AI 233, physics library 235, and game application 200 to provide a unique, interactive game world 236 to players of a video game embodiment described herein. In this example, components of the game world are received from the game application 200 and data manager 210. The simulation engine 230 renders a simulation of an interactive game world 236 containing the aspects of the game world controlled by constrains built into the game logic 234, player AI 232, bot AI 233, and physics library 235. To play the game, players interact with the interactive game world 236 by using the user interface 240 to submit control inputs 241 to the object management system 220. The object management system 220 updates object state information using the control inputs 241 and provides the updated state information to the simulation control module 231 in real time so the simulation control module 231 can dynamically update the simulation provided to players in the user interface 240. FIGS. 3-8 illustrate one possible implementation of a game world within a user interface 240, wherein the game world includes aspects of the gameplay design described herein.

Figure 3:
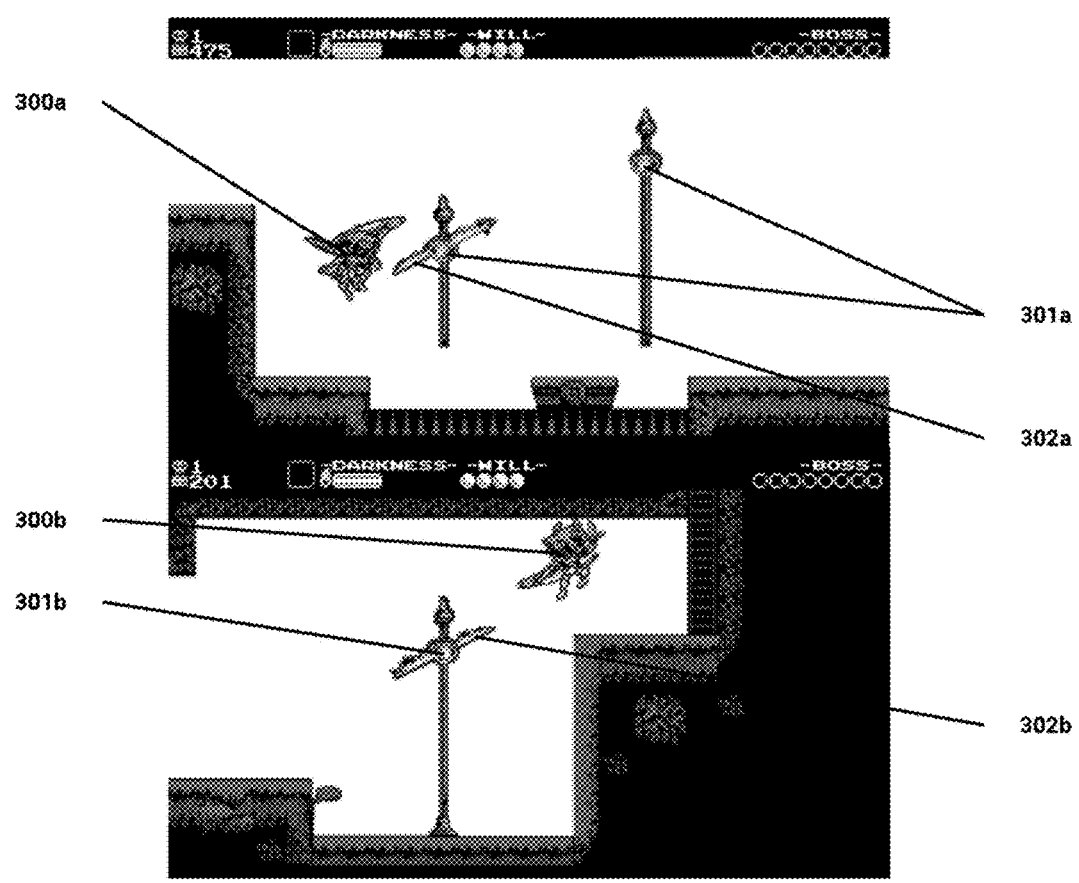
FIG. 3 displays an example game world implementation having dash slash movement, launch object, and directional indicator gameplay elements.

FIG. 3 illustrates a character 300a, 300b interacting with a launch object 301a, 301b using a dash slash. In this example the dash slash is used in the movement context to launch the character 300a, 300b in the air in a particular direction. As seen in the images, a directional indicator 302a, 302b shows the direction the character 300a, 300b will travel after interacting with the launch object 301a, 301b via the dash slash. Characters 300a, 300b must be proximately located to a launch object 301a, 301b in order to trigger display of the directional indicator 302a, 302b. Optionality the character 300a, 300b, the launch object 301a, 301b, or both may have to pass one or more validity tests in order to render the directional indicator 302a, 302b over the launch object 301a, 301b. Accordingly, although both lamps in the upper image are launch objects 301a, only the lower lamp located very close to the character 300a displays the directional indicator 302a. As the character 300a moves towards the right side of the scene, a directional indicator 302a will be displayed on the upper lamp launch object 301a when the character 300a is close enough to interact with the upper launch object 301a. Similarly, the directional indicator 302a will disappear on the lower lamp when the character 300a is too far away to interact with the lower launch object 301a. In this way, the directional indicator describes the character's 300a, 300b context within the game world so that players know the movements that are available to characters 300a, 300b at specific times and positions within a scene.

In one example, the same control button may cause characters 300a, 300b to perform three different movements depending on the gameplay context of the characters 300a, 300b. The indicator describes the gameplay context characters 300a, 300b are in to provide information to players about what movements are available to characters 300a, 300b. For example, a control button causes characters 300a, 300b to perform a lateral attack movement in situations where characters 300a, 300b are not interacting with a launch object 301a, 301b. The same control button causes characters 300a, 300b to launch in the air when interacting with a launch object 301a, 301b. Finally, the same control button causes characters 300a, 300b to strike an object when interacting with a damageable object. By indicating characters 300a, 300b are within range of interacting with a launch object or damageable object, the directional indicator 302a, 302b and other contextual indicators included in the gameplay design described herein allow players to anticipate the movements that are available to characters 300a, 300b at particular times and locations within a scene.

In one possible gameplay design, the directional indicator 302a, 302b responds dynamically to character 300a, 300b location. When the character 300a is at or below the launch object 301a, the directional indicator 302a signals the character 300a will be launched upward by the launch object 301a. When the character 300b is above the launch object 301b, the directional indicator 302b signals the character 300b will be launched downward by the launch object 301b. In this example, the character 300a at or below the launch object 301a is moving to the right causing the character 300a to be launched to the right. Conversely, if the character 300b is above the launch object 301b and moving to the left, interacting with the launch object 301b launches the character 300b down and to the left. The direction and position of a character 300a, 300b relative to the launch object 301a, 301b is controllable by a player so the direction of the launch is also controllable.

Figure 4:
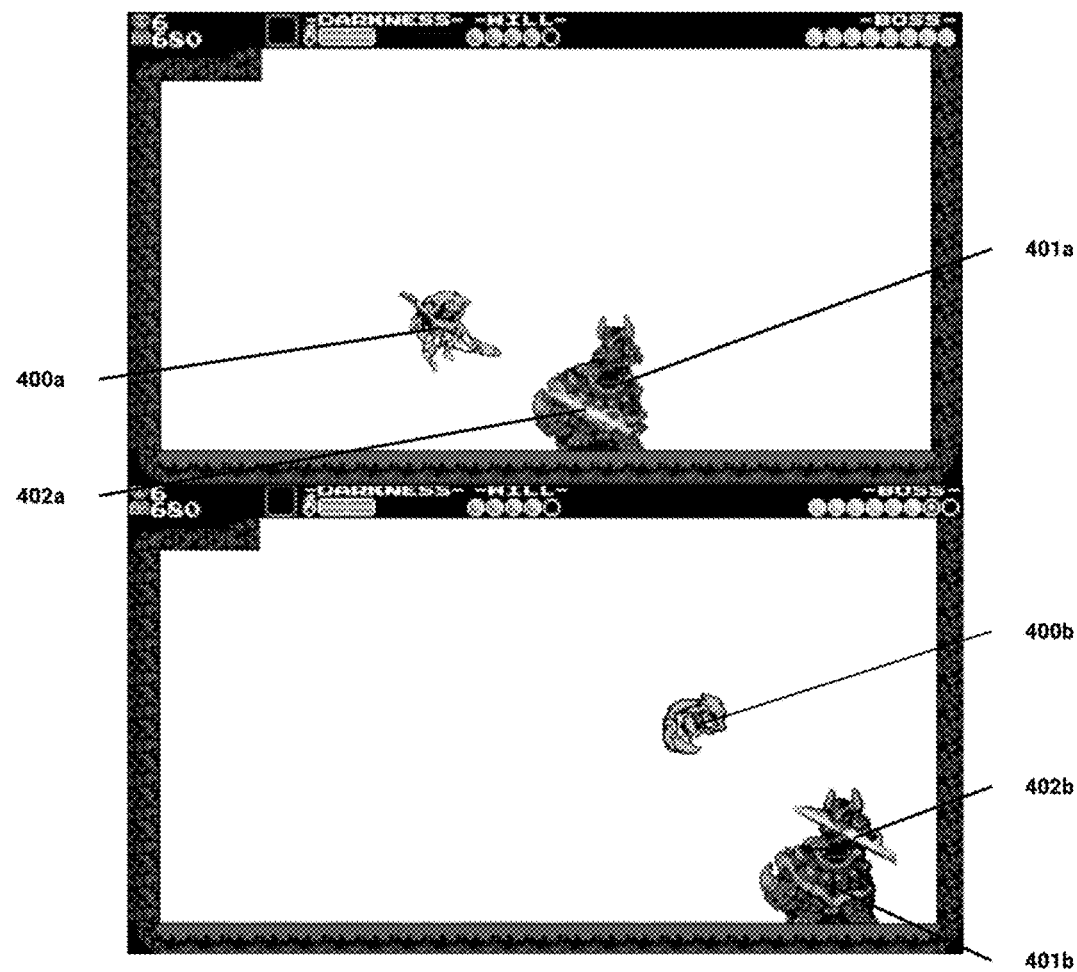
FIG. 4 displays an example game world implementation having dash slash attack, enemy object, and directional indicator gameplay elements.

FIG. 4 illustrates a character 400a, 400b in a combat sequence against an enemy 401a, 401b. The targeting indicator 402a, 402b signals the portion of the enemy 401a, 401b the character will strike when performing a dash slash or other attack movement. The attack angle and, for fatal blows, the cut through angle is also shown by the targeting indicator 402a, 402b. In the upper image, the character 400a is lower in the air than the lower image. Accordingly, the targeting indicator 402a indicates the character 400a will strike the lower portion of the enemy 401a with the dash slash or other attack movement. The character 400b in the lower image is higher in air than the upper image. Therefore, the targeting indicator 402b indicates the character will strike the upper portion of the enemy 401b with the dash slash or other attack movement. In this example, the character 400b in the lower image was able to reach a higher position that is more proximate to the upper portion of the enemy 402b because the character 400b performed a bounce back recovery spin following the initial strike to the lower portion of the enemy 402b. Accordingly, a well controlled bounce back recovery spin can be used to gain access to one or more portions of the enemy 402a, 402b that are not accessible in character 400a, 400b jump movements from a ground surface.

Figure 5:
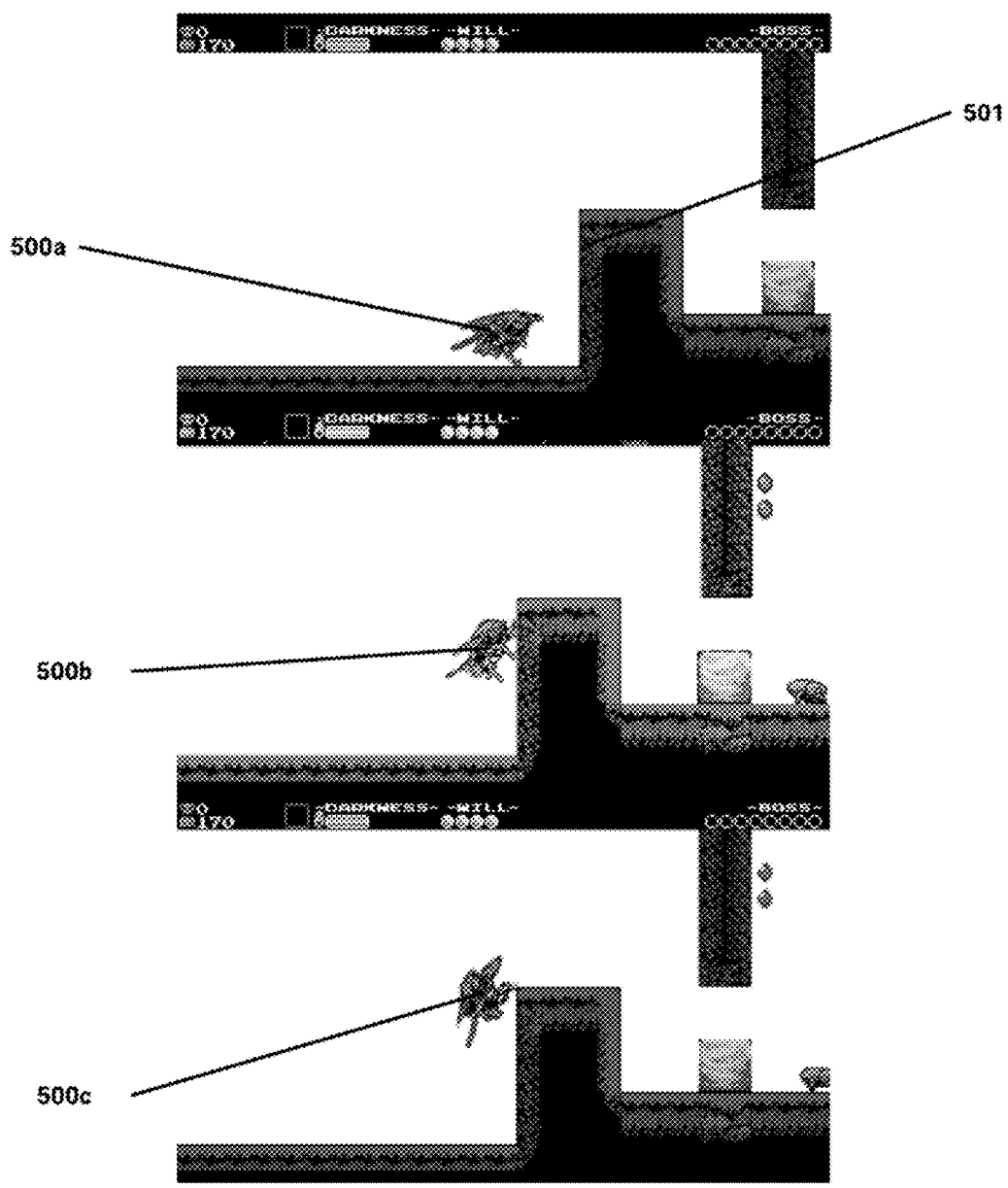
FIG. 5 illustrates an example game world implementation having a wall climb movement gameplay element.
Figure 6:
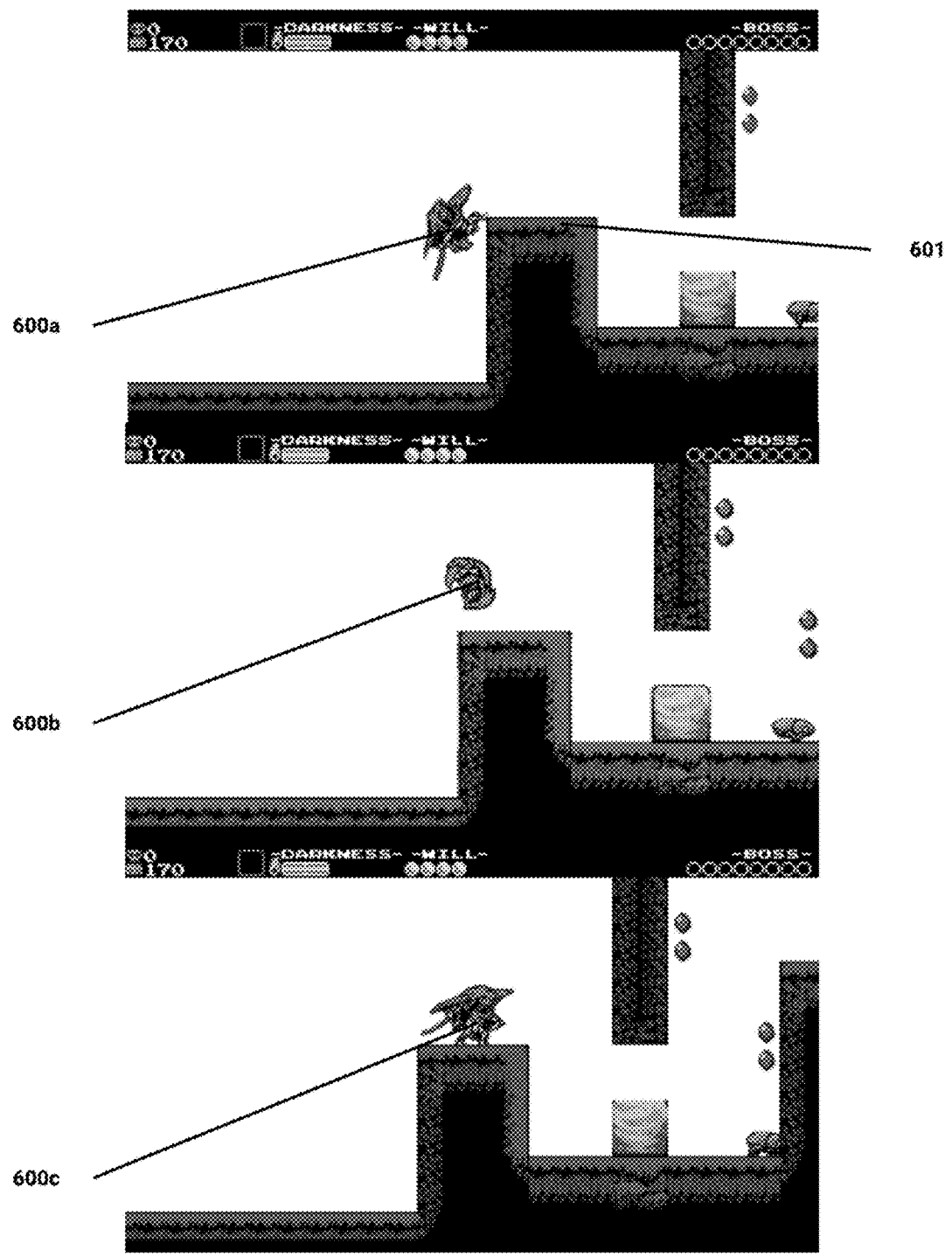
FIG. 6 illustrates an example game world implementation having a kip up movement and a Contra spin movement gameplay elements for taking characters over the top of vertical surfaces following successful wall climbs.

FIG. 5-6 illustrate a will climb and kip up movement. FIG. 5 illustrates a wall climb movement where the character 500a starts on a ground surface running toward a vertical surface 501. The character 500b runs into or alternatively jumps on to the vertical surface 501 and grabs on to the vertical surface 501 with its feet parallel to the surface. The character 500c then begins walking up the vertical surface as provided for by the wall climb animation. FIG. 6 illustrates the kip up animation that flips the character 600a, 600b, 600c up and over the top of a vertical surface 601 following a successful wall climb. The top of the vertical surface 601 must be reached within the timing and distance constrains of the wall climb animation to perform the kip up animation, otherwise the character 600a, 600b, 600c will flip off of the vertical surface. To complete the kip up animation, the character 600a reaches the top of the vertical surface 601 with the wall climb movement. The character 600b then flips up above the vertical surface it just ascended and spins over the top of the vertical surface 601. After completing at least one full rotation, the character 600c stands on the landing surface on top of the vertical surface 601. In one example, to land on a landing surface following a kip up animation, a player must hold a direction of the landing surface. If the player does not hold a direction of a landing surface, the character falls back down the vertical surface after performing the kip up.

Figure 7:
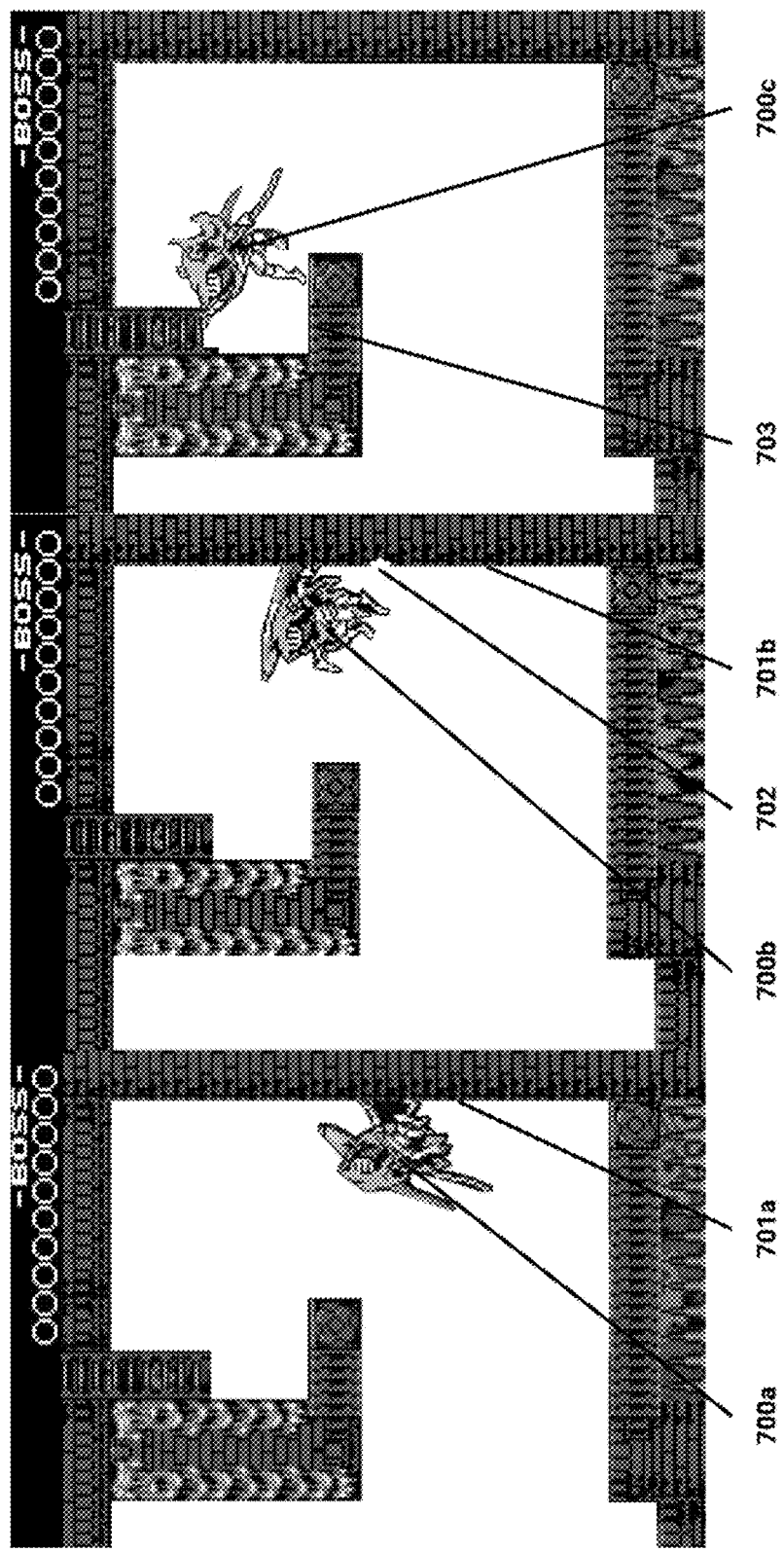
FIG. 7 illustrates an example game world implementation having a wall jump movement gameplay element for taking characters over the top of vertical surfaces following successful wall climbs.

FIG. 7 illustrates a climbing sequence usable for ascending to a suspended surface. The climbing sequence includes a movement chain comprising a wall climb and a wall jump. To begin this climbing sequence, the character 700a jumps from the ground on to a vertical surface 701a and begins a wall climb movement up the vertical surface 701a. At or before the character 700b reaches the maximum distance of the wall climb movement, the character 700b jumps from the vertical surface 701b in a left direction toward the suspended ledge 703. A movement indicator 702 signals the character 700b has performed a wall jump. To reach the suspended ledge 703, the wall jump must be directed up and to the left. In this example, the character 700c is properly directed and the timing of the wall jump occurred deep enough into the wall climb movement to give the character 700c enough lift the land on top of the suspended ledge 703 and stand on the horizontal suspended surface. In other examples, the suspended surface could be another vertical surface in which case the character 700a, 700b, 700c would begin another wall climb animation in the direction indicated by the player. Following the second wall climb animation another chaining movement, for example, a wall jump, spin, flip, or dash slash could be used to bring the character 700a, 700b, 700c a further vertical distance, thereby allowing the character 700a, 700b, 700c to reach another vertical surface or land on top of a horizontal surface.

Figure 8:
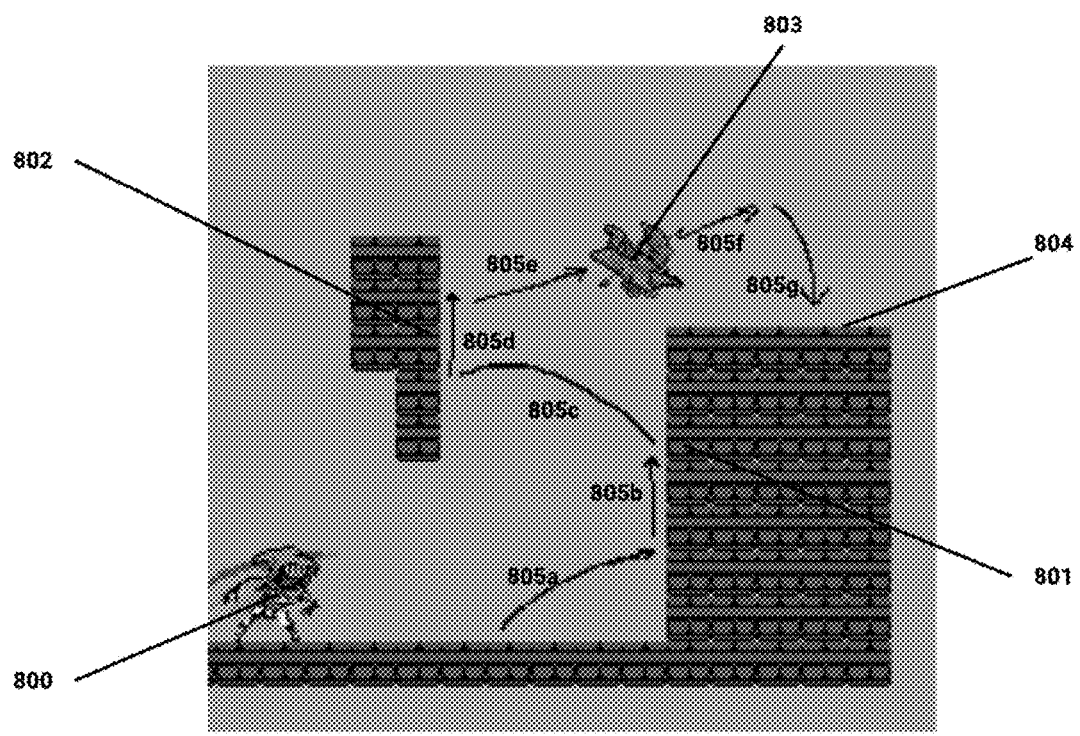
FIG. 8 illustrates an example game world implementation showing one example complex climbing path achievable using the wall climb movement gameplay elements described herein.

FIG. 8 illustrates an example complex climbing sequence including multiple wall climbs, multiple chaining actions, and a dash slash movement. To begin the sequence, the character 800 starts on the ground running to the right toward a vertical surface 801. The character 800 jumps 805a from the ground surface to the vertical surface 801 and begins a wall climb animation 805b. At or before reaching maximum wall climb distance, the character 800 performs a wall jump 805c to the left to reach a suspended wall surface 802. The character 800 then performs a second wall climb animation 805d up the suspended wall surface 802. At or before reaching maximum wall climb distance for the second wall climb, the character 800 performs a second wall jump 805e in the right direction back toward the vertical surface 801 and a flying launch object 803. In proximity to the flying launch object 803, the character 800 performs a dash slash movement 805f through the flying launch object 803 at a position equal to or below the flying launch object 803 so that the flying launch object 803 launches the character toward the top of the vertical surface 801. The direction of the dash slash movement is to the right of the flying object 803 therefore the dash slash movement takes the character over the top of the vertical surface 801 allowing the character to land 805g on the horizontal surface 804 at the top of the vertical surface. This is just one example of complex climbing sequences made possible by the character movement aspects of the gameplay design described herein.

What is claimed is:

1. A system comprising a memory storing program instructions including a video game application, a user interface, and one or more processors executing the video game application causing the one or more processors to perform operations, including:
   generating an interactive digital game world having a character, a ui indicator, and a plurality of scenes, each scene in the plurality of scenes assembled by combining landscape elements, static objects, dynamic objects, and an interactive object into an arrangement navigable by the character using a sequence of character movements;
   rendering the interactive game world in the user interface, the user interface having a controller for entering controls causing the character to perform character movements;
   continuously tracking a position of the character relative to the landscape elements, static objects, dynamic objects, and interactive object within each scene based on controls received from the controller; and
   in response to detecting the position of the character is within range of engaging with an interactive object, displaying the ui indicator over the interactive object, the ui indicator providing context about the character movements the character may perform when engaging with an interactive object, the context provided by the ui indicator depending on the position of the character relative to the landscape elements, static objects, dynamic objects, and interactive object within each scene.

2. The system of claim 1, further comprising modifying the ui indicator based on conditions comprising character conditions, interactive object conditions, or character and object interaction conditions.

3. The system of claim 1, further comprising positioning the ui indicator over a portion of the interactive object according to constraints comprising character constraints, virtual object constraints, gameplay context constraints, or character and virtual object interaction constraints.

4. The system of claim 1, wherein the context provided by the ui indicator is specific to a video game gameplay situation.

5. The system of claim 1, wherein the context provided by the ui indicator includes a visual cue describing the direction of character movements.

6. The system of claim 1, wherein the ui indicator comprises a directional ui indicator or a targeting ui indicator.

7. The system of claim 1, wherein the ui indicator is a directional ui indicator and the interactive object is a launch object, the launch object launches airborne characters in a direction suggested by the directional ui indicator.

8. The system of claim 1, further comprising one or more scenes included in the plurality of scenes having a dynamic landscape that shifts to alter one or more paths characters can take to move through the scene.

9. A gaming device comprising:
a processor;
a memory storing a set of program instructions executable on the processor to cause the gaming device to perform operations comprising:
generating an interactive digital game world including a character, a ui indicator, and a plurality of scenes, each scene in the plurality of scenes assembled by combining landscape elements, static objects, dynamic objects, and an interactive object into an arrangement navigable by the character using a sequence of character movements;
rendering the interactive game world in a user interface having a screen for displaying the interactive game world and a controller for entering input controls for causing the character to perform character movements;
continuously tracking a position of the character relative to the landscape elements, static objects, dynamic objects, and interactive object within each scene based on controls received from the controller; and
in response to detecting the position of the character is within range of engaging with an interactive object, displaying the ui indicator over the interactive object, the ui indicator providing context about the character movements the character may perform when engaging with an interactive object, the context provided by the ui indicator depending on the position of the character relative to the landscape elements, static objects, dynamic objects, and interactive object within each scene.

10. The device of claim 9, wherein the ui indicator is removed based on conditions of the game world failing a validity test on a character movement at detecting the position of the character within range of engaging with an interactive object.

11. The device of claim 9, wherein the ui indicator is a directional indicator or a targeting indicator.

12. The device of claim 9, the ui indicator is positioned over a portion of the interactive object according to targeting constraints specific to the interactive object.

13. A computer implemented method comprising:
accessing a non-transitory computer readable medium storing a video game application having program instructions for providing a video game gameplay; and
executing, by a processor, a series of program instructions included in the video game application to generate the video game gameplay in a user interface, the video game gameplay comprising:
a character programmed to perform one or more character movements;
an interactive digital game world having a plurality of scenes, each scene included in the plurality of scenes assembled by combining landscape elements, static objects, dynamic objects, and an interactive object into an arrangement navigable by the character using a sequence of character movements,
the interactive object positioned in an accessible area of the game world, in response to detecting the position of the character is within range of engaging with an interactive object, displaying the ui indicator over the interactive object, the ui indicator providing context about a character movement the character may perform when engaging with an interactive object, the character movement comprising:
striking one or more objects and, in response to striking the one or more objects with a non-fatal blow causing the character to perform a bounce back and recovery spin animation.

14. The method of claim 13, wherein the bounce back portion of the bounce back and recovery spin animation launches the character in a direction opposite the one or more objects struck by the the character.

15. The method of claim 13, wherein the bounce back and recovery spin animation may be chained with a subsequent character movement.

16. The method of claim 13, wherein chains of character movement followed by bounce back and recovery spin animation are performed by the character to repeatedly strike the one or more objects.

17. The method of claim 13, wherein fatal blows delivered by the character using the character movement causes a character to cut through an object.

18. The method of claim 13, wherein the ui indicator is a targeting indicator that indicates a portion of the one or more objects the character strikes with the character movement.

19. The method of claim 18, wherein a position of the targeting indicator changes based on a position of the character relative to the one or more objects the character is targeting.

* * * * *